Sept. 15, 1970        R. B. KENNEDY        3,529,229
ELECTRIC CAR BATTERY RECHARGE SYSTEM
Filed Jan. 2, 1968        2 Sheets—Sheet 1
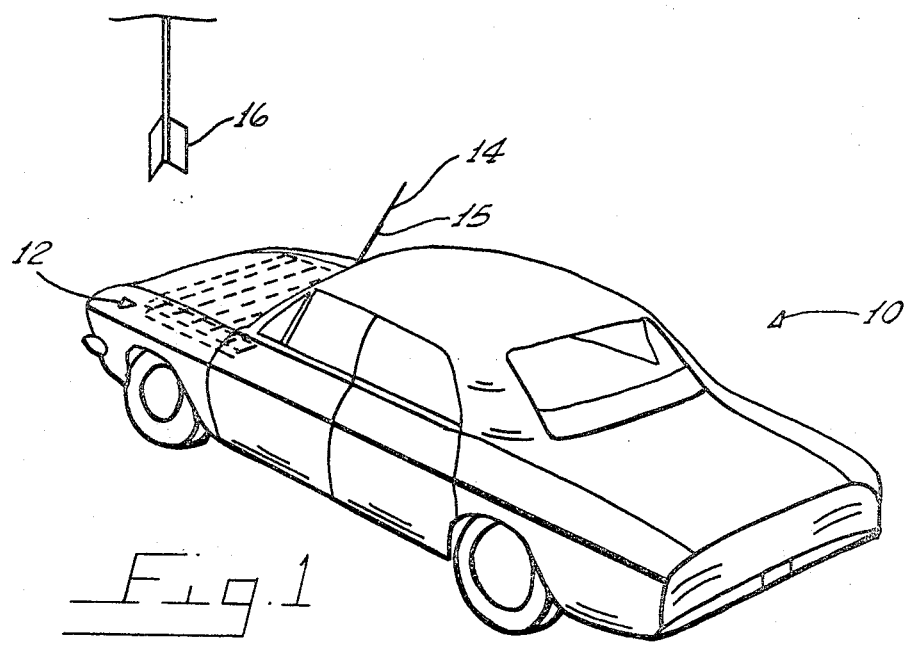
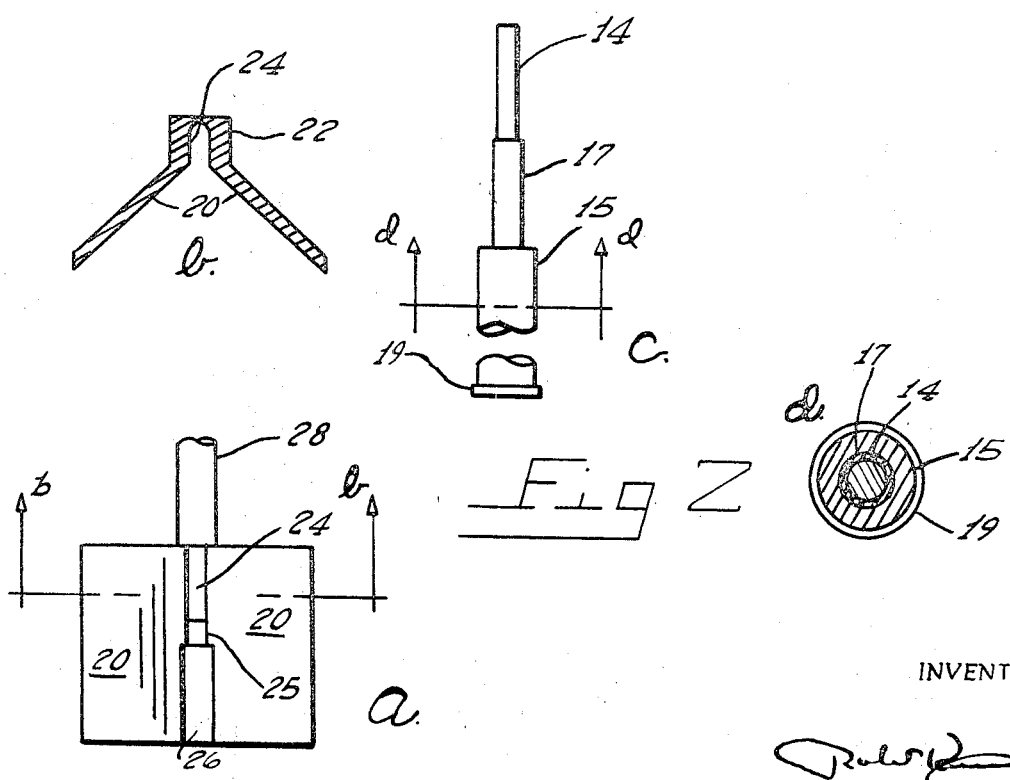
INVENTOR.

Sept. 15, 1970   R. B. KENNEDY   3,529,229
ELECTRIC CAR BATTERY RECHARGE SYSTEM
Filed Jan. 2, 1968   2 Sheets-Sheet 2
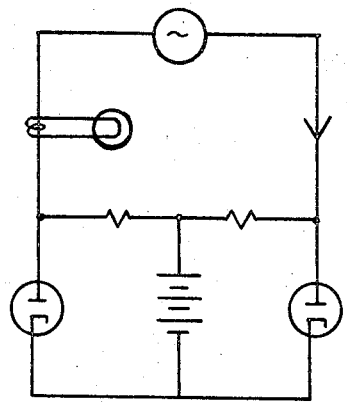
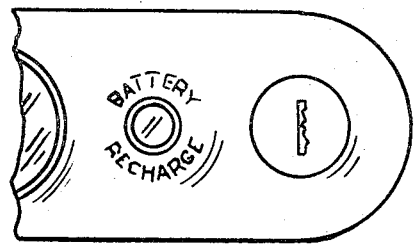
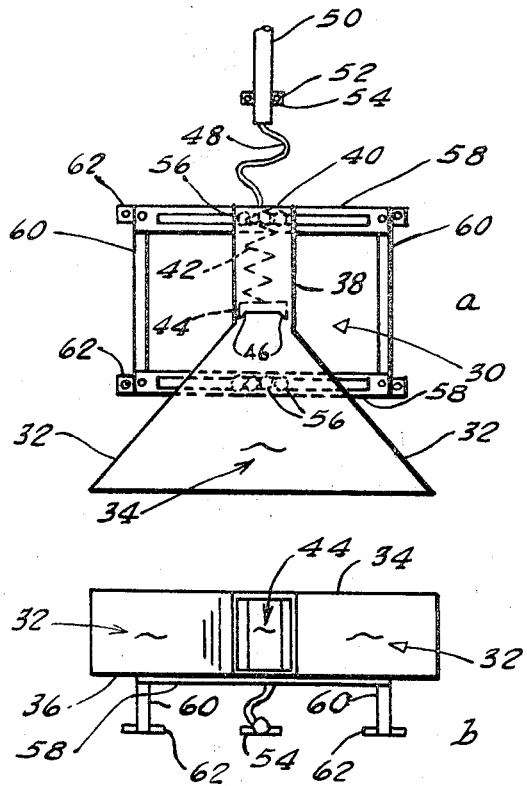
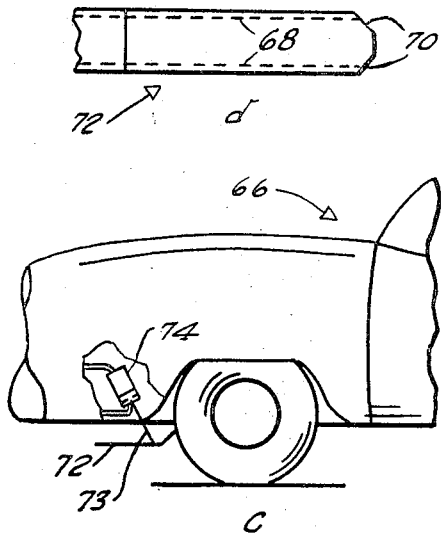
INVENTOR.

United States Patent Office 3,529,229
Patented Sept. 15, 1970

3,529,229
ELECTRIC CAR BATTERY RECHARGE SYSTEM
Robert B. Kennedy, 251 Greenoaks Drive,
Atherton, Calif. 94025
Filed Jan. 2, 1968, Ser. No. 694,935
Int. Cl. H02j 7/02
U.S. Cl. 320—2                                                        5 Claims

ABSTRACT OF THE DISCLOSURE

A battery recharge system for automatically recharging the battery of an electric car from a municipal source of electric energy when the car is in a predesignated parking area. The system comprises electrical conductors communicable to the exterior of the electric car, means for electrically coupling the conductors with battery terminals, and means for automatically coupling the conductors with the municipal source of electric energy when the car is in the predesignated parking area.

BACKGROUND OF THE INVENTION

Present day use of vehicles powered by electric energy is largely confined to sport and amusement activities. That such vehicles have not yet come into substantial use in general purpose transportation has been attributable to state of the art limitations in battery technology. Recent research and development advancements in this art however have brought us much closer to the day in which electric cars will be employed in general transportation.

At present experimental electric cars have obtained driving ranges approaching that necessary to service daily city commuters, housewives and other local drivers without battery recharge. But at this juncture regular recharging of batteries used as the primary source of vehicular power is still mandatory. The recharge interval for average local driving ranges is approximately daily. As battery technology continues to advance, this recharge interval will undoubtedly increase. Nevertheless daily recharging will remain desirable both from technical and personal habit views.

The special purpose, electrically powered vehicles in general use today, such as golf carts, are recharged by means of electric cords having conventional male and female connectors which are manually plugged into the cart and a stationary socket. Other carts are equipped with recoil lines having no disconnect between the line and cart. In either case however the electric cord must be manually connected to a municipal source of electric power in order to affect recharge. Should an operator forget to plug in the recharge cord, he may well be without sufficient residual battery power the next time he needs use of the vehicle.

Accordingly it is an object of the present invention to provide a system for recharging the battery of an electric car without manual action by the operator divorced from normal driving maneuvers.

Another object of the invention is to provide a system for recharging the battery of an electric car from a municipal source of electric energy when the car is located in a predesignated parking area, and to provide means assisting the car operator in guiding the car into such an area.

Another object of the invention is to provide an electric car battery recharge system that is reasonably safe, when used in a proper manner, to personnel located in proximity with the system.

Yet another object of the invention is to provide means indicating a recharging condition of an electric car battery.

SUMMARY OF THE INVENTION

Briefly described the present invention is a battery recharge system for recharging the battery of an electric car from a municipal source of electric energy when the electric car is in a predesignated parking area. The recharge system comprises electrical conductors communicable to the exterior of the car, means for electrically coupling the conductors to battery terminals, and means for automatically coupling the conductors with the municipal source of electric energy when the electric car is in the predesignated parking area.

BRIEF DESCRIPTION OF THE DRAWINGS

FIG. 1 is a perspective of an electric car having one embodiment of the battery recharge system of the present invention.

FIG. 2a is a frontal view in elevation of energy coupling means shown in FIG. 1 above the car. FIG. 2b is a cross-sectional view of FIG. 2a taken along line b—b. FIG. 2c is a partial view in elevation of coaxial conductors attached to the exterior of the electric car as shown in FIG. 1. FIG. 2d is a cross-sectional view of the coaxial conductors shown in FIG. 2c taken along line d—d.

FIG. 3 is a circuit diagram of the recharge system shown in FIG. 1.

FIG. 4 is a fragmentary view in elevation of an electric car dashboard having a recharge indicator.

FIG. 5a is a plan view of another embodiment of means for automatically coupling electric energy to the battery of an electric car. FIG. 5b is a frontal view in elevation of the coupling means shown in FIG. 5a. FIG. 5c is a partial side view in elevation of an electric car having conductors located exteriorly of the car body for engagement with the coupling means illustrated in FIG. 5a and FIG. 5b. FIG. 5d is a partial plan view of the exterior conductors shown attached to the undercarriage of the car illustrated in FIG. 5c.

DESCRIPTION OF THE PREFERRED EMBODIMENTS

Referring now in more detail to the drawing, there is illustrated in FIG. 1 an automobile 10 having batteries 12 with terminals for a primary source of propulsive energy. The electric car has two flexible, coaxial conductors 14 and 15 mounted on the roof of the car cabin above the driver's seat. Located above and in front of car 10 are means 16 for coupling energy from a municipal source. The coupling means is shown in greater detail in FIGS. 2a and 2b as comprising two planar, dielectric guides 20 which are aligned at approximately right angles with one another. These guides are joined by a connecting structure 22 having two semicircular recesses 24 and 26, recess 24 having a smaller diameter than recess 26. The arcuate portion of recess 26 is coated with an electrically conductive material as is the arcuate portion of recess 24. A lower extension 25 of recess 24 is not coated in order to provide electrical isolation between recesses 24 and 26. Insulated electric wiring within conduit 28 respectively links recesses 24 and 26 to a municipal source of electric energy.

As shown in FIGS. 2c and 2d, coaxial conductors 14 and 15, mounted atop car 10, are electrically insulated from each other by tube 17. Conductor 15 may be insulated from the ground provided by the cabin roof by dielectric tubing 19.

The above described structure enables the operator of car 10 to align coaxial conductors 14 and 15 with coupling means 16 by steering the car so as to cause means 16 to pass directly over his head. Coupling means 16 has been installed at a predetermined height to have conductor 14 contact recess 24 and conductor 15 to contact recess 26. Should the coaxial conductors contact the coupling means too high, an erroneous contact between conductor 15 and recess 24 is prevented from occurring by the fact that conductor 15 is too large to enter the recess and contact the conductive coating at the arcuate rear thereof. Should the coaxial conductors make contact too low, insulative tubing 17 contacts recess 26 rather than conductor 14. Minor horizontal alignment errors cause the coaxial conductors to contact one of the dielectric guides 20. As the conductors are flexible they merely slide into their respective recesses.

Once proper contact is made batteries 12 within car 10 automatically begin to recharge as shown in the circuit diagram of FIG. 3. The inclusion of a recharge indicator enables the car operator to know when proper contact has been made. As soon as the light indicator appears on his dashboard as shown in FIG. 4, he brings car 10 to a complete halt. Any minor overshoot is compensated by the flexibility of the coaxial connectors.

Another feature of this embodiment is the inclusion of an antenna in the system as is representatively shown in FIG. 3. One of the coaxial conductors 14 or 15 may be wired to a radio within car 10 thereby having the conductor serve a dual function. Any breaking of the antenna circuit during recharge is not necessary due to the standard inclusion of a blocking capacitor in radio circuitry which will protect the radio from the low frequency recharge current.

FIG. 5 illustrates another embodiment of the invention in which electrical coupling is achieved beneath the car. FIGS. 5a and 5b illustrate coupling means 30 which is designed to be fastened atop the surface of a roadway, garage floor or the like. Coupling means 30 comprises two vertical, nonconductive guides 32 which are aligned at approximately right angles to each other and which are joined together at their top and bottom by protective covers 34 and 36 respectively. The rear ends of guides 32 are connected to a rectangular receptacle 38 over which covers 34 and 36 extend. To the interior of a rear wall 40 of receptacle 38 is attached one end of a spring 42. A dielectric block 44 is attached to the other end of the spring. Two edges 46 of block 44 are coated with a conductive material. Electrical wires connect edges 46 to a municipal source of energy by traversing block 44, extending along the surface of spring 42, through rear wall 40, flexible conduit 48 and rigid conduit 50. Conduit 50 is held to the terrain surface by screws 52 extending through flanges 54.

Within lower cover 36 are rotatably implanted two parallel rows of ball bearings 56 which rest along edges of a slot in parallel guide members 58. Two parallel crossbars 60, the ends of which are rigidly held to the terrain surface by screws through flange 62, support guides 58 above the terrain. Unshown guide stays prevent relative movement between coupling means 30 and guide members 58 except along the parallel guide axes.

FIGS. 5c and 5d illustrate conductors attached to the undercarriage of an electric car 66 for use with the coupling means shown in FIGS. 5a and 5b. Two wires 68 electrically link two beveled and conductive edges 70 of a plow 72 with recharge circuitry within car 66 shown in FIG. 3, less the radio antenna element. The plow is located just forward of the front car wheels where it is not likely to scrape rough terrain over which the car rides, and where its exposed conductors are remote to human contact. The plow may be rigidly attached to the car or it may be moveable. The embodiment shown in FIG. 5c is moveable; it may be lowered and raised by means of mechanical linkage 73 connected to a hydraulicly operated piston and cylinder 74.

The embodiment shown in FIGS. 1 and 2 comprises rigid coupling means and flexible automotive conductors. The embodiment shown in FIG. 5 on the other hand has rigid conductors and flexible coupling means. In the latter case spring 42 allows a driver some overshoot when positioning the car for recharge. Ball bearings 56 permit coupling means 30 to slide along guides 58 to compensate for alignment error. Should car 66, for example, approach coupling means 30 in such a manner that plow 72 is somewhat to the left, the left, beveled and conductive edge 70 will strike left, nonconductive guide 32. At this point the recharge circuit would still be incomplete, of course, and the driver would observe no recharge indication. The driver would thus continue driving the car slowly forward. In doing this the left, beveled edge 70 would press against left nonconductive guide 32 causing it to slide to the left by means of ball bearings 56. As the car travels forward plow 72 would approach and then contact block 44 and thereby establish battery recharge. If the driver does not halt the car as soon as this occurs, spring 42 will allow some overshoot.

It should be understood that the above-described embodiments are merely illustrative of applications of the principals of the invention. Obviously many modifications may be made in the configuration and disposition of the coupling means and conductors without departing from the spirit and scope of the invention as set forth in the following claims.

I claim:

1. A system for automatically recharging a battery having battery terminals of an electric car having a car radio from a municipal source of electric energy when the electric car is in a predesignated parking area, said recharging system comprising electrical conductors communicable to the exterior of said car with at least one of said conductors in electrical communication with said radio thereby functioning as an antenna, means for electrically coupling said battery terminals to said conductors, coupling means locatable within said predesignated parking area and connectable to said municipal source of electric energy, said coupling means adapted to couple to said electrical conductors when said electrical conductors communicate to the exterior of said car and are moved in a predetermined direction within said parking area to a position adjacent said coupling means, and means to provide relative movement between said electrical conductors and said coupling means substantially normal to said predetermined direction to compensate for misalignment of the electrical conductors with the coupling means by the electric car operator in approaching said coupling means in said predetermined direction.

2. A system for automatically recharging a battery having battery terminals of an electric car from a municipal source of electric energy when the electric car is in a predesignated parking area, said recharging system comprising:
  (a) electrical conductors communicable to the exterior of said car,
  (b) means for electrically coupling said battery terminals to said conductors,
  (c) coupling means locatable within said predesignated parking area and connectable to said municipal source of electric energy, said coupling means adapted to automatically couple to said electrical conductors when said electrical conductors communicate to the exterior of said car and said car is moved in a substantially horizontal, predetermined direction within said parking area to a position adjacent said coupling means,
  (d) guide means including opposed, converging guide surfaces for guiding said electrical conductors and said coupling means together into mutual, electric coupling positions as said car is moved in said substantially horizontal, predetermined direction within said parking area, and
  (e) means to provide relative movement between said electrical conductors and said coupling means substantially normal to said predetermined direction to compensate for misalignment of the electrical conductors with the coupling means by the electric car operator in approaching said coupling means in said predetermined direction.

3. The battery recharge system of claim 2 wherein said electric car has a cabin, a cabin roof, a driver's seat within said cabin, and a rear wheel axile, and wherein at least one of said conductors is mounted on said cabin roof along a line extending above said driver's seat normal to said axile whereby a driver may align said one conductor with said means for automatically coupling the conductor with the municipal source of electric energy when driving the car into said predesignated parking area.

4. The battery recharge system of claim 2 wherein said electrical conductors are mounted on the under carriage of said car with at least a portion of said electrical conductors extending beneath said undercarriage in spaced relation therewith in a plane substantially parallel with said undercarriage.

5. The battery recharge system of claim 4 having hydraulic cylinder means for raising and lowering the electrical conductors to and from said undercarriage.

References Cited

UNITED STATES PATENTS

| | | | |
|---|---|---|---|
| 2,966,248 | 12/1960 | Armbruster | 320—2 X |
| 3,105,929 | 10/1963 | Blue | 320—2 |
| 3,273,038 | 9/1966 | Miller | 320—2 |
| 3,340,454 | 9/1967 | Dahl | 320—59 X |

J D MILLER, Primary Examiner

J. M. GUNTHER, Assistant Examiner

U.S. Cl. X.R.

320—59